No. 748,280. PATENTED DEC. 29, 1903.
L. F. HUGHES.
WHIFFLETREE HOOK.
APPLICATION FILED SEPT. 24, 1903.
NO MODEL.
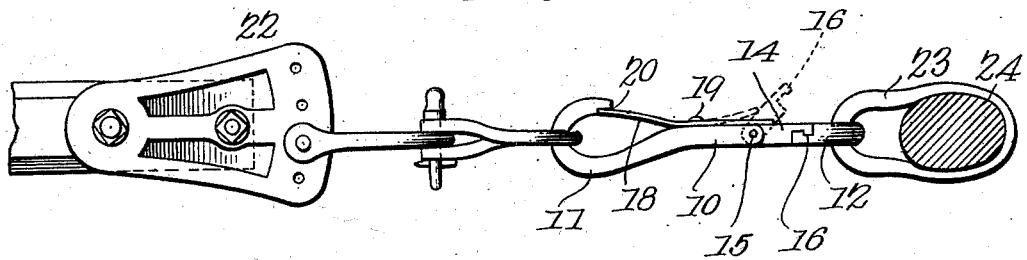
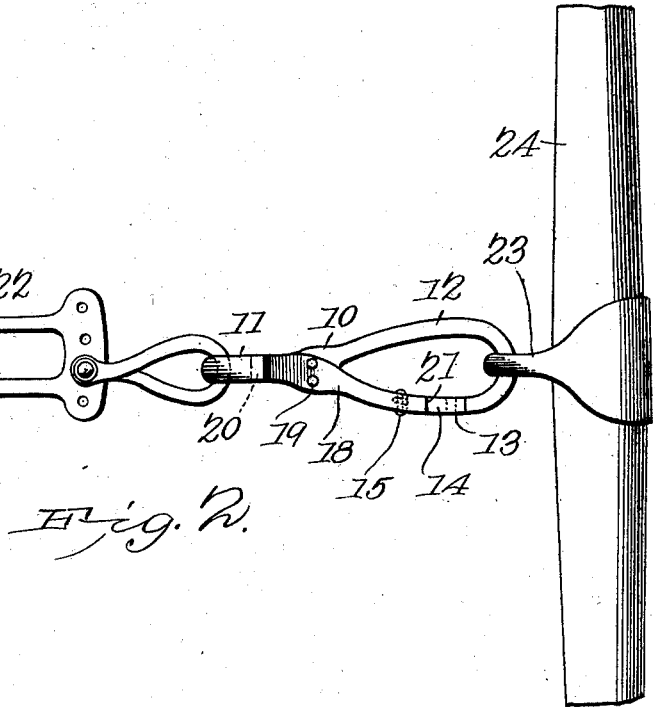
Witnesses
E. F. Stewart
C. N. Woodward
Louis F. Hughes, Inventor
by C. A. Snow & Co.
Attorneys No. 748,280.

Patented December 29, 1903.

UNITED STATES PATENT OFFICE.

LOUIS FRANKLIN HUGHES, OF SICILY ISLAND, LOUISIANA.

WHIFFLETREE-HOOK.

SPECIFICATION forming part of Letters Patent No. 748,280, dated December 29, 1903.

Application filed September 24, 1903. Serial No. 174,515. (No model.)

*To all whom it may concern:*

Be it known that I, LOUIS FRANKLIN HUGHES, a citizen of the United States, residing at Sicily Island, Catahoula parish, and State of Louisiana, have invented a new and useful Whiffletree-Hook, of which the following is a specification.

This invention relates to devices employed for connecting swingle or doubletrees to plows, cultivators, listers, and similar implements, and has for its object to produce a simply-constructed and easily applied and operated device which may be readily and quickly attached and detached and applied to all the various forms of the designated implements manufactured; and the invention consists in certain novel features of construction, as hereinafter shown and described, and specified in the claims.

In the drawings illustrative of the invention, in which corresponding parts are denoted by like designating characters, Figure 1 is a side elevation, and Fig. 2 is a plan view, of the device applied.

The improved device comprises a body portion 10, having a hook 11 turned from one end and a loop 12 extending from the other end, the loop 12 being disposed, preferably, at right angles to the hook 11, as shown. The loop is provided with an opening intermediately of one side, with an outwardly-opening recess 13 adjacent to the opening at one side and a tongue 14, pivoted at 15, at the other side, the tongue provided with a lug 16 for engagement with the recess when the tongue is closed, as shown. By this means when the tongue is closed a complete or closed loop is formed at one end of the body portion.

At the juncture of the loop 12 with the body portion a spring-tongue 18 is connected, as by rivets 19, and extended into engagement with a shoulder 20 in the point of the hook 11 and extended over the tongue or latch 14 by its other end, as at 21, and thus serves the twofold purpose of a yieldable guard to the hook 11 and a yieldable support to the latch 14 and prevents the parts held by the hook or loop from being accidentally displaced.

This device is adapted for coupling the swingle or double tree to the clevises of plows, cultivators, listers, potato-diggers, and similar devices, but may be employed for coupling other structures or implements, if preferred, and I do not, therefore, wish to be limited in the use of the device to any specific implement or structure, but reserve the right to its use for any purpose and in connection with any implement or structure to which it is adapted.

For the purpose of illustration the hook portion 11 is shown coupled to an ordinary plow-clevis 22, while the loop portion 12 is shown connected to the clip portion 23 of a swingletree 24 to illustrate one form of its application and the manner of operation.

In applying the device the tongue 14 is forcibly opened and the clip 23 passed into the loop 12, when the tongue will be automatically restored to its former location by the spring 18, with its stud or lug 16 within the recess 13, as shown, so that the interior surface of the loop is unobstructed and no projections occur either interiorly or exteriorly of the loop upon which the driving-reins or other articles or objects can catch, as will be obvious. The hook 11 is then snapped into the clevis-clip, and the coupling is completed. By this simple means a very complete, simple, and conveniently-operated coupling is provided, which may be applied to all the various forms of plows and similar implements.

The device will be manufactured from malleable iron or steel and may be produced in various sizes, as required.

While the improved device is shown disposed at right angles to the plane of the doubletree 22 or in a vertical position, of course it will be understood that the position could be reversed or employed in any other position without departing from the principle of the invention or sacrificing any of its advantages.

Having thus described the invention, what is claimed is—

1. An article of the class described comprising a body portion having a loop at one end and a hook at the other, said loop having an opening in one side thereof, a tongue pivoted to close said opening, and a spring connected to said body portion and forming a yielding closure for said hook and extended over said tongue to hold it yieldably in closed position.

2. An article of the character described comprising a body portion having a hook at one end and a loop at the other end, said loop having an opening intermediately of one side and with an outwardly-opening recess adjacent to one side of said opening, a tongue pivoted to the opposite side of said opening and having a spur for engagement with said recess when said tongue is closed, and a spring connected to said body portion and forming an inwardly-yielding closure to said hook, and extended over said tongue and maintaining it yieldably in closed position, substantially as described.

3. An article of the character described comprising a body portion having a hook at one end and with a loop at the other end disposed at right angles thereto, said loop having an opening intermediately of one side and with an outwardly-opening recess adjacent to one side of said opening, a tongue pivoted at the opposite side of said opening and provided with a spur for engagement with said recess when the tongue is closed, and a spring secured to said body portion and extending by one end into engagement with the free end of said hook whereby a yieldable closure is formed over the entrance to said hook, and extending by the other end over said tongue and maintaining it yieldably in closed position, substantially as described.

In testimony that I claim the foregoing as my own I have hereto affixed my signature in the presence of two witnesses.

LOUIS FRANKLIN HUGHES.

Witnesses:
 THOS. G. HIGGINS,
 LACEY J. DOSHER.